United States Patent [19]

Nakashima et al.

[11] Patent Number: 4,814,402
[45] Date of Patent: Mar. 21, 1989

[54] CONTACT LENS MATERIAL

[75] Inventors: Tatsutoshi Nakashima, Aichi; Yoshitaka Taniyama; Akihisa Sugiyama, both of Nagoya, all of Japan

[73] Assignee: Menicon Co., Ltd., Nagoya, Japan

[21] Appl. No.: 119,560

[22] Filed: Nov. 12, 1987

[30] Foreign Application Priority Data

Jun. 6, 1987 [JP] Japan ................ 62-141909

[51] Int. Cl.$^4$ ............... C08F 18/20; C08F 20/22; C08F 26/08
[52] U.S. Cl. .................. 526/245; 526/264; 526/279; 523/107; 528/32; 351/160 R; 351/160 H
[58] Field of Search ........ 526/279, 245, 264; 523/107; 528/32; 351/160 R, 160 H

[56] References Cited

U.S. PATENT DOCUMENTS

| 3,808,178 | 4/1974 | Gaylord | 528/26 |
| 4,433,125 | 2/1984 | Ichinobe et al. | 526/279 |
| 4,450,264 | 5/1984 | Cho | 526/279 |
| 4,540,761 | 9/1985 | Kawamura et al. | 526/279 |
| 4,602,074 | 7/1986 | Mizutani et al. | |

FOREIGN PATENT DOCUMENTS

| 8400969 | 3/1984 | European Pat. Off. | 526/279 |
| 61-87102 | 5/1986 | Japan | 526/279 |
| 2153371 | 8/1985 | United Kingdom | 526/279 |

Primary Examiner—Joseph L. Schofer
Assistant Examiner—N. Sarofim
Attorney, Agent, or Firm—Oblon, Fisher, Spivak, McClelland & Maier

[57] ABSTRACT

A contact lens material composed of a copolymer of a monomer mixture comprising, as essential monomers, from 5 to 20 parts by weight, based on 100 parts by weight of the total monomer mixture, of a hydrophilic monomer consisting of from 40 to 60 mol % of N-vinyl-2-pyrrolidone and from 40 to 60 mol % of metharylic acid and from 30 to 95 parts by weight, based on 100 parts by weight of the total monomer mixture, of at least one of a silicon-containing acrylate and a silicon-containing methacrylate.

6 Claims, No Drawings

CONTACT LENS MATERIAL

The present invention relates to a contact lens material. More particularly, it relates to a highly oxygen permeable contact lens material having excellent hydrophilic properties and scratch hardness.

Contact lens materials are generally classified into two types, i.e. a soft contact lens material wherein a hydrophilic polymer composed essentially of 2-hydroxyethyl methacrylate or a soft hydrophobic polymer such as silicone rubber is used, and a hard contact lens material wherein a hard material such as polymethyl methacrylate is used. The hard contact lens material is inferior to the soft contact lens in the wearing comfort when the contact lens is put on the eye. Yet, it is superior in the dimensional stability and the durability and easy to handle. Thus, the hard contact lens has its own merits and is still widely used.

The most serious drawback of the hard contact lens made of polymethyl methacrylate is that it has poor oxygen permeability and is incapable of supplying oxygen required for the metabolism of the corneal tissues from the atmosphere to the cornea through the lens material. Therefore, when put on the cornea for a long period of time, it is likely to lead to a metabolic trouble of the corneal tissues.

In recent years, various studies have been made to improve the oxygen permeability. For example, a contact lens material wherein a siloxanylalkyl methacrylate is used (Japanese Examined Patent Publication No. 33502/1977) and a hard contact lens material composed of a copolymer made of a monomer mixture comprising, as essential monomer components, tris(trimethylsiloxy)silylpropyl methacrylate and 2,2,2-trifluoroethyl methacrylate (Japanese Examined Patent Publication No. 8769/1987) have been developed.

However, these materials have poor hydrophilic properties, and it was necessary to increase the hydrophilic properties by copolymerizing a hydrophilic monomer such as 2-hydroxyethyl methacrylate or N-vinyl-2-pyrrolidone (Japanese Unexamined Patent Publication No. 130714/1985). However, if such a hydrophilic monomer is used in a substantial amount, water tends to be impregnated into the lens material, whereby a difficulty such as a decrease in the surface hardness of the lens or a change in the prescription of the contact lens such as a change in the base curve will be brought about. For such reasons, the amount of its use has been limited, and it has been impossible to substantially increase the hydrophilic properties of the lens.

Under these circumstances, the present inventors have conducted extensive research to overcome such problems inherent to the conventional technique and to obtain a contact lens material having high oxygen permeability as well as excellent hydrophilic properties and surface hardness and as a result, have found a contact lens material which is capable of solving such problems. The present invention has been accomplished on the basis of the discovery.

The present invention provides a contact lens material composed of a copolymer of a monomer mixture comprising, as essential monomers, from 5 to 20 parts by weight, based on 100 parts by weight of the total monomer mixture, of a hydrophilic monomer consisting of from 40 to 60 mol % of N-vinyl-2-pyrrolidone and from 40 to 60 mol % of methacrylic acid and from 30 to 95 parts by weight, based on 100 parts by weight of the total monomer mixture, of at least one of a silicon-containing acrylate and a silicon-containing methacrylate.

Now, the present invention will be described in detail with reference to the preferred embodiments.

In the following description, "parts" means "parts by weight".

The contact lens material of the present invention is composed of a copolymer of a monomer mixture which comprises, as essential monomer components, from 5 to 20 parts, based on 100 parts of the total monomer mixture, of a hydrophilic monomer consisting of from 40 to 60 mol % of N-vinyl-2-pyrrolidone and from 40 to 60 mol % of methacrylic acid and from 30 to 95 parts of at least one of a silicon-containing acrylate and a silicon-containing methacrylate.

As mentioned above, the hydrophilic monomer consists of N-vinyl-2-pyrrolidone and methacrylic acid. In the contact lens material of the present invention, the hardness of the material, the scratch hardness and the impact hardness have been improved by using such a hydrophilic monomer for the contact lens material of the present invention.

With respect to the proportions of the N-vinyl-2-pyrrolidone and the methacrylic acid, it is preferred to adjust the molar ratio of N-vinyl-2-pyrrolidone/methacrylic acid to a range of from 40/60 to 60/40. If the molar ratio is smaller than 40/60 or larger than 60/40, the water absorptivity of the material increases, the hardness of the material decreases, and the optical properties tend to be inferior, such being undesirable.

The hydrophilic monomer is used usually within a range of from 5 to 20 parts, preferably from 5 to 15 parts, based on 100 parts of the total monomer mixture. If the amount of the hydrophilic monomer exceeds 20 parts, the oxygen permeability decreases. If the amount is less than 5 parts, no adequate improvement in the hydrophilic properties and in the hardness tends to be obtained, such being undesirable.

The above-mentioned at least one of a silicon-containing acrylate and a silicon-containing methacrylate (hereinafter referred to as a silicon-containing (meth)acrylate) is incorporated for the purpose of imparting high oxygen permeability to the contact lens material. Specific examples of such a silicon-containing (meth)acrylate include, for example,
pentamethyldisiloxanylmethyl methacrylate,
pentamethyldisiloxanylmethyl acrylate,
pentamethyldisiloxanylpropyl methacrylate,
pentamethyldisiloxanylpropyl acrylate,
methylbis(trimethylsiloxy)silylpropyl methacrylate,
methylbis(trimethylsiloxy)silylpropyl acrylate,
tris(trimethylsiloxy)silylpropyl methacrylate,
tris(trimethylsiloxy)silylpropyl acrylate,
mono[methylbis(trimethylsiloxy)siloxy]bis(trimethylsiloxy)silylpropyl methacrylate,
mono[methylbis(trimethylsiloxy)siloxy]bis(trimethylsiloxy)silylpropyl acrylate,
tris[methylbis(trimethylsiloxy)siloxy]silylpropyl methacrylate,
tris[methylbis(trimethylsiloxy)siloxy]silylpropyl acrylate,
methylbis(trimethylsiloxy)silylpropylglycerol methacrylate,
methylbis(trimethylsiloxy)silylpropylglycerol acrylate,
tris(trimethylsiloxy)silylpropylglycerol methacrylate,
tris(trimethylsiloxy)silylpropylglycerol acrylate,
mono[methylbis(trimethylsiloxy)siloxy]bis(trimethylsiloxy)silylpropylglycerol methacrylate, mono[methylbis(trimethylsiloxy)siloxy]bis(trimethylsiloxy)silylpropylglycerol acrylate,
trimethylsilylethyltetramethyldisiloxanylpropylglycerol methacrylate,
trimethylsilylethyltetramethyldisiloxanylpropylglycerol
acrylate,
trimethylsilylmethyl methacrylate,
trimethylsilylmethyl acrylate,
trimethylsilylpropyl
methacrylate, trimethylsilylpropyl acrylate,
trimethylsilylpropylglycerol acrylate,
pentamethyldisiloxanylpropylglycerol acrylate,
trimethylsilylpropylglycerol methacrylate,
pentamethyldisiloxanylpropylglycerol methacrylate,
methylbis(trimethylsiloxy)silylethyltetramethyldisiloxanylmethyl methacrylate,
methylbis(trimethylsiloxy)silylethyltetramethyldisiloxanylmethyl acrylate,
tetramethyltriisopropylcyclotetrasiloxanylpropyl methacrylate,
tetramethyltriisopropylcyclotetrasiloxanylpropyl acrylate,
tetramethyltriisopropylcyclotetrasiloxybis(trimethylsiloxy)silylpropyl methacrylate and
tetramethylisopropylcyclotetrasiloxybis(trimethylsiloxy)silylpropyl acrylate.

It is preferred to select one or more (meth)acrylates among these for use. Among these silicon-containing (meth)acrylates, a monomer represented by the formula:

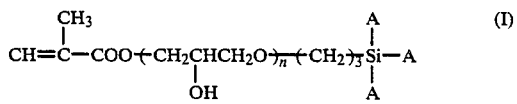

wherein A is —CH₃ or

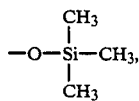

and n is 0 or 1, is preferred, since it can readily be prepared.

The silicon-containing (meth)acrylate is used usually in an amount within a range of from 30 to 95 parts, preferably from 50 to 85 parts, based on 100 parts of the total monomer mixture to be copolymerized. If the amount of the silicon-containing (meth)acrylate exceeds 95 parts, the resulting contact lens material tends to be too soft, and if the amount is less than 30 parts, the resulting contact lens material tends to have low oxygen permeability, such being undesirable.

In the present invention, in addition to the above-mentioned essential monomers, a fluoroalkyl (meth)acrylate or an alkyl (meth)acrylate may be copolymerized.

The fluoroalkyl (meth)acrylate is preferably used for the purpose of improving the strength of the material while maintaining the oxygen permeability and thus improving the durability of the contact lens. Specific examples of such a fluoroalkyl (meth)acrylate include, for example,
2,2,2-trifluoroethyl methacrylate,
2,2,2-trifluoroethyl acrylate,
2,2,3,3,-tetrafluoropropyl methacrylate,
2,2,3,3-tetrafluoropropyl acrylate,
2,2,3,3,3-pentafluoropropyl methacrylate,
2,2,3,3,3-pentafluoropropyl acrylate,
hexafluoroisopropyl methacrylate,
2,2,2-trifluoro-1-trifluoromethylethyl acrylate,
2,2,3,3-tetrafluoro-tert-amyl methacrylate,
2,2,3,3-tetrafluoro-tert-amyl acrylate,
2,2,3,4,4,4-hexafluorobutyl methacrylate,
2,2,3,4,4,4-hexafluorobutyl acrylate,
2,2,3,4,4,4-hexafluoro-tert-hexyl methacrylate,
2,2,3,4,4,4-hexafluoro-tert-hexyl acrylate,
2,2,3,3,4,4,5,5-octafluoropentyl methacrylate,
2,2,3,3,4,4,5,5-octafluoropentyl acrylate,
2,3,4,5,5,5-hexafluoro-2,4-bis(trifluoromethyl)pentyl methacrylate,
2,3,4,5,5,5-hexafluoro-2,4-bis(trifluoromethyl)pentyl acrylate,
2,2,3,3,4,4,5,5,6,6,7,7-dodecafluoroheptyl methacrylate,
2,2,3,3,4,4,5,5,6,6,7,7-dodecafluoroheptyl acrylate,
2-hydroxy-4,4,5,5,6,7,7,7-octafluoro-6-trifluoromethylheptyl methacrylate,
2-hydroxy-4,4,5,5,6,7,7,7-octafluoro-6-trifluoromethylheptyl acrylate,
2-hydroxy-4,4,5,5,6,6,7,7,8,9,9,9-dodecafluoro-8-trifluoromethylnonyl methacrylate,
2-hydroxy-4,4,5,5,6,6,7,7,8,9,9,9-dodecafluoro-8-trifluoromethylnonyl acrylate,
2-hydroxy-4,4,5,5,6,6,7,7,8,8,9,9,10,11,11,11-hexadecafluoro-10-trifluoromethylundecyl methacrylate and
2-hydroxy-4,4,5,5,6,6,7,7,8,8,9,9,10,11,11,11-hexadecafluoro-10-trifluoromethylundecyl acrylate.

It is preferred to select one or more (meth)acrylates among these for use.

Among these fluoroalkyl (meth)acrylates, 2,2,2-trifluoroethyl methacrylate or hexafluoroisopropyl methacrylate is particularly preferred since it can readily be prepared and the hardness of the resulting copolymer will be high.

The fluoroalkyl (meth)acrylate is used usually in an amount within a range of not exceeding 50 parts, based on 100 parts of the total monomer mixture to be copoymerized. If the amount of the fluoroalkyl (meth)acrylate exceeds 50 parts, the oxygen permeability tends to deteriorate.

The alkyl (meth)acrylate is preferably used for the purpose of increasing the strength of the copolymer and improving the durability of the contact lens. Specific examples of such an alkyl (meth)acrylate include, for example, methyl methacrylate, methyl acrylate, ethyl methacrylate, ethyl acrylate, isopropyl methacrylate, isopropyl acrylate, tert-butyl methacrylate, tert-butyl acrylate, isobutyl methacrylate, isobutyl acrylate, tert-amyl methacrylate, tert-amyl acrylate, 2-ethylhexyl methacrylate, 2-ethylhexyl acrylate, lauryl methacrylate, lauryl acrylate, cyclohexyl methacrylate and cyclohexyl acrylate. It is preferred to select one or more (meth)acrylates among these for use.

The alkyl (meth)acrylate is used usually in an amount within a range of from about 0 to about 60 parts, preferably from 0 to 30 parts, based on 100 parts of the total monomer mixture to be copolymerized.

Further, a cross-linkable monomer is effective for the purpose of stabilizing the prescribed shape of the contact lens and improving the chemical resistance. Specific examples of such a cross-linkable monomer include, for example, ethylene glycol dimethacrylate, ethylene glycol diacrylate, diethylene glycol dimethacrylate, diethylene glycol diacrylate, allyl methacrylate, allyl acrylate, trimethylolpropane trimethacrylate and trimethylolpropane triacrylate. It is preferred to select one or more cross-linkable monomers among these for use.

The cross-linkable monomer is used usually in an amount within a range of from about 0 to about 20 parts, preferably from about 1 to about 10 parts, based on 100 parts of the total monomer mixture to be copolymerized.

Now, the contact lens material of the present invention will be described in further detail with reference to Reference Examples, Working Examples and Comparative Examples. However, it should be understood that the present invention is by no means restricted by such specific Examples.

REFERENCE EXAMPLES 1 to 8

N-vinyl-2-pyrrolidone and methacrylic acid were copolymerized in the proportions as identified in Table 1 to obtain a copolymer. The rubber hardness and the water absorptivity of the copolymer thus obtained were measured. The results are shown in Table 1.

The rubber hardness and the water absorptivity were measured in accordance with the following methods.

Rubber hardness:

A cylindrical sample having a diameter of 12.7 mm and a thickness of 12 mm with both end surfaces finished flat and smooth, was immersed in a 0.9% sodium chloride aqueous solution at room temperature for about 2 weeks. Then, the rubber hardness was measured in accordance with the spring hardness test (A-type) of JIS (Japanese Industrial Standard) K 6301 (Method for the Physical Test of Vulcanized Rubber).

Water absorptivity:

A cylindrical sample having a diameter of 12.7 mm and a thickness of 5 mm with both end surfaces finished flat and smooth, was immersed in a 0.9% sodium chloride aqueous solution at room temperature (about 20° C.) for about 2 weeks, whereupon the weight ($W_1$) was measured. Then, the sample was dried in an air-circulating dryer at 50° C. for about 1 week, whereupon the weight ($W_2$) was measured. The water absorptivity was calculated in accordance with the following equation.

$$\text{Water absorptivity} = \frac{W_1 - W_2}{W_2} \times 100 \, (\%)$$

parts of ethylene glycol dimethacrylate, 4.8 parts of methacrylic acid, 6.2 parts of N-vinyl-2-pyrrolidone and 0.20 part of azobisdimethylvaleronitrile (hereinafter referred to simply as V-65) as a polymerization initiator, were thoroughly mixed and introduced into a glass test tube, and the test tube was sealed. The sealed test tube was immersed in a constant temperature water tank, and polymerization was conducted at 35° C. for 40 hours. Then, heat polymerization was stepwise conducted in an air-circulating dryer at 50° C. for 6 hours, at 60° C. for 1 hour, at 70° C. for 1 hour, at 80° C. for 1 hour, at 90° C. for 1 hour, at 100° C. for 1 hour and at 110° C. for 1 hour. The colorless transparent copolymer thus obtained was cut and subjected to machining by grinding and polishing to obtain a contact lens and a sample for the measurement of the physical properties.

The physical properties were measured in accordance with the following methods.

(1) The Rockwell hardness was measured with respect to a cylindrical sample having a diameter of 12.7 mm and a thickness of 5 mm with both end surfaces finished flat and smooth by Rockwell Superficial Hardness Meter manufactured by Akashi Seisakusho K.K. under a load of 15 kg.

(2) The water absorptivity was measured in the same manner as in Reference Examples 1 to 8.

(3) The oxygen permeability coefficient was measured with respect to a test sample having a diameter of 12.7 mm and a thickness of 0.2 mm in a 0.9% sodium chloride aqueous solution at 35° C. by Seikaken-type film oxygen permeability tester manufactured by Rika Seiki Kogyo K.K.

(4) The contact angle was measured with respect to a cylindrial sample having diameter of 12.7 mm and a thickness of 4 mm with both end surfaces finished flat and smooth with distilled water by Goniometer-type contact angle tester manufactured by Elma Kogaku K.K.

(5) The scratch hardness was determined by measuring the width of a scratching mark made by a needle under a load of 50 g on a cylindrical sample having a diameter of 12.7 mm and a thickness of 5 mm with the both end surfaces finished flat and smooth, by U-F Scratch Hardness Meter manufactured by Kamishima Seisakusho K.K.

The results are shown in Table 2.

EXAMPLES 2 to 11 and COMPARATIVE EXAMPLES 1 to 9

TABLE 1

| Reference Example No. | N—vinyl-2-pyrrolidone (parts) | Methacrylic acid (parts) | Molar ratio of N—vinyl-2-pyrrolidone to methacrylic acid | Properties of the obtained copolymer | |
|---|---|---|---|---|---|
| | | | | Rubber hardness (degree) | Water absorptivity (%) |
| 1 | 40 | 80 | 34.1/65.9 | 89.7 | 6.7 |
| 2 | 44.4 | 51.6 | 40/60 | — | 4.2 |
| 3 | 50 | 50 | 43.6/56.4 | — | 1.8 |
| 4 | 55.5 | 43.0 | 50/50 | 83.9 | 0.1 |
| 5 | 60 | 40 | 53.7/46.3 | 84.6 | 0.1 |
| 6 | 66.6 | 34.4 | 60/40 | 80.9 | 13.8 |
| 7 | 70 | 30 | 64.4/35.6 | 79.1 | 29.2 |
| 8 | 77.7 | 25.8 | 70/30 | 74.7 | 44.9 |

It is evident from the results of Table 1 that when N-vinyl-2-pyrrolidone and methacrylic acid are used in equimolar amounts, the water absorptivity can be reduced almost to 0%.

EXAMPLE 1

71 Parts of tris(trimethylsiloxy)silylpropyl methacrylate, 29 parts of hexafluoroisopropyl methacrylate, 6

Contact lenses and samples for measuring the physical properties were prepared in the same manner as in Example 1 except that the monomer and the polymerization initiator (0.20 part of V-65) were adjusted as shown in Table 2. Various physical properties were measured in the same manner as in Example 1. The results are shown in Table 2.

TABLE 2

| Example No. | AA N—VP | AA MAA | BB SK-5001 | BB S158T | CC 3FE | CC 6FP | DD MMA | EE EDMA | N—VP/MAA (molar ratio) | Rockwell hardness (—) | Water absorptivity (%) | FF | Contact angle (degree) | Scratch hardness (μm) |
|---|---|---|---|---|---|---|---|---|---|---|---|---|---|---|
| 1 | 6.2 | 4.8 | 71 | — | — | 29 | — | 6 | 50/50 | −101 | 0.50 | 106.3 | 72 | 116 |
| 2 | 2.82 | 2.18 | 50 | — | — | — | 40 | 5 | 50/50 | −25 | 0.88 | 30.3 | 67 | 98 |
| 3 | 2.82 | 2.18 | 32.5 | — | 40 | — | 15 | 7.5 | 50/50 | −9 | 0.50 | 31.2 | 74 | 95 |
| 4 | 2.82 | 2.18 | — | 50 | — | — | 40 | 5 | 50/50 | −12 | 1.08 | 16.8 | 60 | 96 |
| 5 | 5.64 | 4.36 | 45 | — | — | 55 | — | 7 | 50/50 | −55.3 | 0.39 | 86.3 | 68 | 112 |
| 6 | 5.1 | 5.9 | 71 | — | — | 29 | — | 6 | 40/60 | −102 | 0.52 | 107.3 | 102 | 119 |
| 7 | 5.5 | 5.5 | 71 | — | — | 29 | — | 6 | 44/56 | −101 | 0.51 | 104.7 | 84 | 117 |
| 8 | 6.5 | 4.5 | 71 | — | — | 29 | — | 6 | 53/47 | −103 | 0.48 | 104.5 | 96 | 117 |
| 9 | 7 | 4 | 71 | — | — | 29 | — | 6 | 58/42 | −105 | 0.50 | 107.6 | 88 | 117 |
| 10 | 5.64 | 4.36 | 80 | — | — | 20 | — | 7 | 50/50 | −122 | 0.58 | 99.2 | 100 | 126 |
| 11 | 9.14 | 7.06 | 78.15 | — | — | 21.85 | — | 10.19 | 50/50 | −88 | 0.91 | 79.7 | 93.4 | 113 |
| Comparative Example No. | | | | | | | | | | | | | | |
| 1 | — | — | 50 | — | — | — | 45 | 5 | 0/0 | −38 | 0.47 | 29.6 | 87 | 99 |
| 2 | — | 5 | 50 | — | — | — | 40 | 5 | 0/100 | −41 | 0.85 | | 85 | 97 |
| 3 | 5 | — | 50 | — | — | — | 40 | 5 | 100/0 | −50 | 1.11 | 28.2 | 83 | 101 |
| 4 | — | — | 32.5 | — | 40 | — | 20 | 7.5 | 0/0 | −18 | 0.30 | 33.5 | 95 | 95 |
| 5 | — | 5 | 32.5 | — | 40 | — | 15 | 7.5 | 0/100 | −19 | 0.65 | 32.2 | 84 | 95 |
| 6 | 5 | — | 32.5 | — | 40 | — | 15 | 7.5 | 100/0 | −22 | 0.68 | 32.7 | 80 | 97 |
| 7 | — | — | — | 50 | — | — | 45 | 5 | 0/0 | −44 | 1.05 | 16.4 | 88 | 98 |
| 8 | — | 5 | — | 50 | — | — | 40 | 5 | 0/100 | −42 | 1.52 | 16.1 | 81 | 97 |
| 9 | 5 | — | — | 50 | — | — | 40 | 5 | 100/0 | −52 | 1.58 | 16.1 | 75 | 99 |
| 10 | — | 9.6 | 71 | — | — | 29 | — | 6 | 0/100 | −129 | 0.60 | 105.1 | 80 | 125 |
| 11* | 11 | — | 71 | — | — | 29 | — | 6 | 100/0 | −138 | 0.91 | 98.3 | 99 | 131 |

Notes:
AA: Hydrophilic monomer (parts)
BB: Silicon-containing methacrylate (parts)
CC: Fluoroalkyl (meth)acrylate (parts)
DD: Alkyl (meth)acrylate (parts)
EE: Cross-linkable monomer (parts)

FF: Oxygen permeability coefficient $\times 10^{-11} \left( \dfrac{cc \cdot cm}{cm^2 \cdot sec \cdot mmHg} \right)$ N—VP: N—vinyl-2-pyrrolidone
MAA: Methacrylic acid
SK-5001: Tris(trimethylsiloxy)silylpropyl methacrylate
S154T: Tris(trimethylsiloxy)silylpropylglycerol methacrylate
3FE: 2,2,2-trifluoroethyl methacrylate
6FP: Hexafluoroisopropyl methacrylate
MMA: Methyl methacrylate
EDMA: Ethylene glycol dimethacrylate
*The product of Comparison Example 11 had white turbidity.

It is evident from the results of Table 2 that when the hydrophilic monomer is used, the hardness can be improved while the oxygen permeability is substantially equal and the contact angle can be reduced without increasing the water absorptivity, whereby the surface hydrophilic properties can be increased, as compared with the case where the respective components are used alone.

The contact lens material of the present invention exhibits excellent hydrophilic properties and high oxygen permeability while maintaining the desirable hardness of the contact lens, and it is suitable for use as contact lenses.

We claim:

1. A contact lens material composed of a copolymer of a monomer mixture comprising, as essential monomers, (a) from 5 to 20 parts by weight, based on 100 parts by weight of the total monomer mixture, of a hydrophilic monomer consisting of from 40 to 60 mol % of N-vinyl-2-pyrrolidone and from 40 to 60 mol % of methacrylic acid and (b) from 50 to 85 parts by weight, based on 100 parts by weight of the total monomer mixture, of at least one member selected from the group consisting of a silicon-containing acrylate and a silicon-containing methacrylate.

2. The contact lens material according to claim 1, wherein said monomer (b) is a monomer represented by the formula:

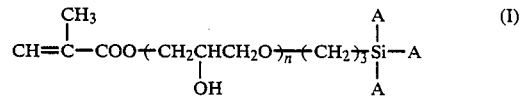

wherein A is —CH₃ or

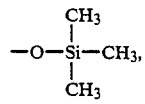

and n is 0 or 1.

3. The contact lens material according to claim 1, wherein the monomer mixture contains not more than 50 parts by weight, based on 100 parts by weight of the total monomer mixture, of at least one member selected from the group consisting of a fluoroalkyl acrylate and a fluoroalkyl methacrylate.

4. The contact lens material according to claim 1, wherein the monomer mixture contains not more than 60 parts by weight, based on 100 parts by weight of the total monomer mixture, of at least one member selected form the group consisting of an alkyl acrylate and an alkyl methacrylate.

5. The contact lens material according to claim 1, wherein the monomer mixture contains not more than 20 parts by weight, based on 100 parts by weight of the total monomer mixture, of a cross-linkable monomer.

6. A contact lens material composed of a copolymer of a monomer mixture consisting essentially of (a) from 5 to 20 parts by weight of a hydrophilic monomer consisting of from 40 to 60 mol % of N-vinyl-2pyrrolidone and from 40 to 60 mol % of methacrylic acid, (b) from 50 to 85 parts by weight of at least one member selected from the group consisting of a silicon-containing acrylate and a silicon-containing methacrylate, (c) from 0 to 50 parts by weight of at least one member selected from the group consisting of a fluoroalkyl acrylate and a fluoroalkyl methacrylate, (d) from 0 to 60 parts by weight of at least one member selected from the group consisting of an alkyl acrylate or an alkyl methacrylate, and (e) from 0 to 20 parts by weight of a cross-linkable monomer, based on 100 parts by weight of the total monomer mixture.

* * * * *